(12) United States Patent
Donchev et al.

(10) Patent No.: US 12,392,965 B2
(45) Date of Patent: Aug. 19, 2025

(54) COMPACT SPLICE ENCLOSURE WITH IMPROVED ACCESS TO ADAPTERS

(71) Applicant: PPC BROADBAND, INC., East Syracuse, NY (US)

(72) Inventors: Stefan Donchev, Milton Keynes (GB); Afzal V. Abdulsalam, Edathala (IN)

(73) Assignee: PPC BROADBAND, INC., East Syracuse, NY (US)

( * ) Notice: Subject to any disclaimer, the term of this patent is extended or adjusted under 35 U.S.C. 154(b) by 153 days.

(21) Appl. No.: 18/073,841

(22) Filed: Dec. 2, 2022

(65) Prior Publication Data
US 2023/0176287 A1 Jun. 8, 2023

Related U.S. Application Data

(60) Provisional application No. 63/285,576, filed on Dec. 3, 2021.

(51) Int. Cl.
*G02B 6/38* (2006.01)
*G02B 6/255* (2006.01)

(52) U.S. Cl.
CPC ......... *G02B 6/2553* (2013.01); *G02B 6/3825* (2013.01)

(58) Field of Classification Search
CPC ....... G02B 6/2553; G02B 6/3825; G02B 6/26
See application file for complete search history.

(56) References Cited

U.S. PATENT DOCUMENTS

| | | | |
|---|---|---|---|
| 8,385,711 B2 * | 2/2013 | Fabrykowski | G02B 6/44528 385/136 |
| 2013/0209049 A1 | 8/2013 | Kowalczyk et al. | |
| 2021/0373270 A1 * | 12/2021 | Takeuchi | G02B 6/44528 |

FOREIGN PATENT DOCUMENTS

| | | |
|---|---|---|
| CN | 207924212 U | 9/2018 |
| WO | 2017001893 A1 | 1/2017 |

OTHER PUBLICATIONS

International Search Report and Written Opinion dated Mar. 30, 2023 in corresponding International Application No. PCT/US2022/051633, 15 pages.

* cited by examiner

*Primary Examiner* — Jennifer Doan
(74) *Attorney, Agent, or Firm* — MH2 TECHNOLOGY LAW GROUP LLP

(57) ABSTRACT

A splice enclosure that may include a body portion, a lower portion, an adapter portion, and a splice portion. The adapter portion may be configured to pivot relative to the body portion between a first adapter portion position and a second adapter portion position. The splice portion may be configured to pivot relative to the body portion between a first splice portion position and a second splice portion position. The adapter portion may configured to be disposed between the splice portion and the lower portion when the splice portion is in the first splice portion position and the adapter portion is in the first adapter portion position such that the splice portion is configured to block access to the adapter portion The splice portion also may be configured to permit access to the adapter portion when the splice portion is pivoted to the second splice portion position such that the adapter portion is configured to be selectively pivoted to the second adapter portion position so as to provide improved access to an adapter that is configured to be coupled with the adapter portion.

29 Claims, 14 Drawing Sheets

COMPACT SPLICE ENCLOSURE WITH IMPROVED ACCESS TO ADAPTERS

CROSS-REFERENCE TO RELATED APPLICATION

This application claims the benefit of U.S. Provisional Application No. 63/285,576 filed Dec. 3, 2021, the disclosure of which is hereby incorporated by reference herein in its entirety.

TECHNICAL FIELD

The present disclosure generally relates to fiber optic cable systems. More particularly, the present disclosure relates to fiber optic cable systems for providing fiber to the premises.

BACKGROUND

Optical networks are becoming prevalent in part because service providers want to deliver high bandwidth communication capabilities to customers. Optical networks are a desirable choice for delivering high speed communication data because they may not need to employ active electronic devices, such as amplifiers and repeaters, between a central office and a subscriber termination. The absence of active electronic devices may decrease network complexity and/or cost and may increase network reliability.

FIG. 1 shows an exemplary network 300 deploying passive fiber optic lines. As shown in FIG. 1, the network 300 may include a central office 310 that connects a number of end subscribers 315 (also called end users 315 herein) in a network. The central office 310 may additionally connect to a larger network such as the Internet (not shown) and/or a public switched telephone network (PSTN). The network 300 may also include one or more fiber distribution hubs (FDHs) 330 having one or more optical splitters (e.g., 1-to-8 splitters, 1-to-16 splitters, or 1-to-32 splitters) that generate a number of individual optical fibers that may lead to the premises of an end user 315. The various lines of the network can be aerial or housed within underground conduits.

The portion of network 300 that is closest to central office 310 is generally referred to as the F1 region, where F1 is the "feeder fiber" from the central office. The F1 portion of the network may include a distribution cable having, for example, 12 to 48 optical fibers. However, alternative implementations may include fewer or more optical fibers. The portion of network 300 that includes an FDH 330 and a number of end users 315 may be referred to as an F2 portion of network 300. Splitters used in an FDH 330 may accept a feeder cable having a number of optical fibers and may split those incoming fibers into, for example, 216 to 432 individual distribution fibers that may be associated with a like number of end user locations.

Referring to FIG. 1, the network 300 includes a plurality of breakout locations 325 at which branch cables are separated out from main cable lines 320. Breakout locations 325 can also be referred to as tap locations, drop cable locations, splice locations or branch locations. Branch cables can also be referred to as drop cables, drop lines, breakout cables or stub cables. Branch cables are often connected to drop terminals 304 that include connector interfaces for facilitating coupling the fibers of the branch cable to a plurality of different subscriber locations. Breakout locations 325 are often enclosed by a field mounted enclosure which protects optical splices (e.g., fusion or mechanical splices) or other types of optical couplings (e.g., connectorized optical couplings) provide at the breakout location 325. Since breakout locations are often provided at mid-span locations on the main cable being accessed, it may be desirable provide field mounted enclosures that are readily mountable at mid-span access locations without requiring the main cable to be "threaded" lengthwise through the enclosure.

It may be desirable to provide a splice enclosure where a splice tray is configured to permit access to an adapter holder when the splice tray is pivoted to a second position such that the adapter holder can be pivoted to a second position so as to provide improved access to an adapter that is configured to be coupled with the adapter holder and to optically couple a terminated fiber with a fiber of a drop cable.

It may be desirable to provide a compact splice enclosure that provides: (1) improved access to an adapter plate that is configured to receive connectors; (2) a three layer design providing fiber storage, a patching field, and a splice field; and (3) double sealing for improved environmental protection.

SUMMARY

Fiber optic networks can extend to multi-dwelling units such as apartment buildings and condominiums. FIG. 2 shows a fiber optic network including a cable 350 routed into a multi-dwelling unit 352. Within the multi-dwelling unit 352, branch cables/fibers are optically coupled to the fibers of the cable 350 at optical coupling locations (e.g., fusion splices, mechanical splices or connectorized optical couplings). The optical coupling locations can be enclosed within one or more wall boxes that are typically equipped with doors/covers that can be opened to provide easy access to the optical coupling locations. The wall boxes are typically provided at different floors of the multi-dwelling unit with each wall box having optical coupling locations corresponding to a plurality of different subscribers (e.g., each resident on a given floor).

One example embodiment of the present disclosure relates to a splice enclosure which includes a main body, a cover, a spool module, an adapter plate, and a splice tray. The main body defines a chamber having an opening. The cover may be pivotably affixed to a top side of the main body. The adapter plate may be configured to be pivotably affixed to a post of the lower spool hub. The cover may be configured to selectively open and close access to the chamber of the main body wherein the cover is configured to pivot open in a first direction. In embodiments, the adapter plate includes an adapter and the adapter plate is configured to pivot open in a second direction to provide improved access to a port of the adapter. In embodiments, the adapter plate and adapter are disposed between the splice tray and the lower spool hub when the splice tray and the adapter plate are pivoted down to a closed position. In embodiments, the splice tray defines a perimeter which is substantially commensurate with the opening of the main body.

In embodiments, an aperture in the splice enclosure is configured to receive an upstream cable portion. The upstream cable portion includes a plurality of bypass optical fibers and a plurality of terminated optical fibers. The lower spool hub and an upper spool hub are configured to store an excess length of the plurality of terminated fibers which are wound around the upper spool hub and the lower spool hub. The plurality of bypass fibers are configured to be routed out of the main body as a first downstream cable via a second aperture in the splice enclosure.

In embodiments, the terminated fibers are configured to be spliced to a first set of pig tails such that each terminated fiber is configured to be spliced to a corresponding pigtail in the first set of pigtails. The first set of pigtails is configured to be connected to a second set of pigtails at the adapter. The second set of pigtails are configured to be downstream.

Embodiments provide a splice enclosure where a splice tray is configured to permit access to an adapter holder when the splice tray is pivoted to a second position such that the adapter holder can be pivoted to a second position so as to provide improved access to an adapter that is configured to be coupled with the adapter holder and to optically couple a terminated fiber with a fiber of a drop cable.

According to various embodiments of the disclosure, a splice enclosure includes: a body configured to define a chamber having an opening; a cover configured to be pivotally coupled with the body so as to selectively close the opening; a spool module that includes a spool hub and a post; an adapter holder configured to be pivotally coupled with the post of the spool module; and a splice tray configured to be pivotally coupled with the spool module.

According to various aspects of the above embodiments of the splice enclosure, the cover is configured to pivot relative to the body from a closed position that prevents access to the chamber to an open position that permits access to the chamber.

According to various aspects of the above embodiments of the splice enclosure, the adapter holder is configured to pivot relative to the body between a first adapter holder position and a second adapter holder position.

According to various aspects of the above embodiments of the splice enclosure, the splice tray is configured to pivot relative to the body between a first splice tray position and a second splice tray position.

According to various aspects of the above embodiments of the splice enclosure, the adapter holder is configured to be disposed between the splice tray and the spool hub when the splice tray is in first splice tray position and the adapter holder is in the first adapter holder position such that the splice tray is configured to block access to the adapter holder.

According to various aspects of the above embodiments of the splice enclosure, the main body includes an input aperture that is configured to receive an upstream cable.

According to various aspects of the above embodiments of the splice enclosure, the upstream cable includes a bypass fiber and a terminated fiber.

According to various aspects of the above embodiments of the splice enclosure, the main body includes an output aperture that is configured to receive a downstream cable that includes the bypass fiber.

According to various aspects of the above embodiments of the splice enclosure, the splice tray is configured to permit access to the adapter holder when the splice tray is pivoted to the second splice tray position such that the adapter holder is configured to be selectively pivoted to the second adapter holder position so as to provide improved access to an adapter that is configured to be coupled with the adapter holder and to optically couple the terminated fiber with a fiber of a drop cable.

According to various aspects of the above embodiments of the splice enclosure, the splice tray includes an upper spool hub, and wherein the upper spool hub is configured to store an excess length of the plurality of terminated fibers.

According to various aspects of the above embodiments of the splice enclosure, the splice tray comprises a splice holder.

According to various aspects of the above embodiments of the splice enclosure, the splice holder is configured to receive a splice of the terminated fiber to a first pigtail.

According to various aspects of the above embodiments of the splice enclosure, the first pigtail is configured to be connected to a second pigtail at the adapter holder.

According to various aspects of the above embodiments of the splice enclosure, the second pigtail is routed from the adapter holder to outside of the splice enclosure.

According to various aspects of the above embodiments of the splice enclosure, the splice tray is configured to define a perimeter which substantially covers the opening of the chamber.

According to various aspects of the above embodiments of the splice enclosure, bypass fiber comprises a plurality of bypass fibers.

According to various aspects of the above embodiments of the splice enclosure, the terminated fiber comprises a plurality of terminated fibers.

According to various embodiments of the disclosure, a splice enclosure includes: a body portion configured to define a chamber having an opening; a cover portion configured to be pivotally coupled with the body portion so as to selectively close the opening; a spool portion configured to include a spool sub portion; an adapter portion configured to be pivotably attached to the spool portion; and a splice tray portion configured to be pivotably attached to the spool portion.

According to various aspects of the above embodiments of the splice enclosure, the adapter portion is configured to pivot relative to the body portion between a first adapter portion position and a second adapter portion position.

According to various aspects of the above embodiments of the splice enclosure, the splice tray portion is configured to pivot relative to the body portion between a first splice tray position and a second splice tray position.

According to various aspects of the above embodiments of the splice enclosure, the adapter portion is configured to be disposed between the splice tray portion and the spool sub portion when the splice tray portion and the adapter portion are in the first positions such that the splice tray portion is configured to block access to the adapter portion.

According to various aspects of the above embodiments of the splice enclosure, the body portion is configured to receive a terminated fiber.

According to various aspects of the above embodiments of the splice enclosure, the splice tray portion is configured to permit access to the adapter portion when the splice tray portion is pivoted to the second splice tray position such that the adapter portion is configured to be selectively pivoted to the second adapter portion position so as to provide improved access to an adapter that is configured to be coupled with the adapter portion and to optically couple the terminated fiber with a fiber of a drop cable.

According to various aspects of the above embodiments of the splice enclosure, the splice tray portion includes an upper spool hub, and wherein the upper spool hub is configured to store an excess length of the terminated fiber.

According to various aspects of the above embodiments of the splice enclosure, the adapter portion comprises an adapter plate.

According to various aspects of the above embodiments of the splice enclosure, the body portion includes an input aperture that is configured to receive an upstream cable, and wherein the upstream cable includes a bypass fiber and the terminated fiber.

According to various aspects of the above embodiments of the splice enclosure, the bypass fiber comprises a plurality of bypass fibers.

According to various aspects of the above embodiments of the splice enclosure, the terminated fiber comprises a plurality of terminated fibers.

According to various aspects of the above embodiments of the splice enclosure, the splice tray portion comprises a splice holder.

According to various aspects of the above embodiments of the splice enclosure, the splice holder is configured to receive a splice of the terminated fiber to a first pigtail.

According to various aspects of the above embodiments of the splice enclosure, the first pigtail is configured to be connected to a second pigtail at the adapter portion.

According to various aspects of the above embodiments of the splice enclosure, the second pigtail is routed from the adapter portion to outside of the splice enclosure.

According to various embodiments of the disclosure, a splice enclosure includes: a body portion; a lower portion; an adapter portion; and a splice portion. The adapter portion is configured to pivot relative to the body portion between a first adapter portion position and a second adapter portion position; the splice portion is configured to pivot relative to the body portion between a first splice portion position and a second splice portion position; the adapter portion is configured to be disposed between the splice portion and the lower portion when the splice portion is in the first splice portion position and the adapter portion is in the first adapter portion position such that the splice portion is configured to block access to the adapter portion; and the splice portion is configured to permit access to the adapter portion when the splice portion is pivoted to the second splice portion position such that the adapter portion is configured to selectively pivot to the second adapter portion position so as to provide improved access to an adapter that is configured to be coupled with the adapter portion.

According to various aspects of the above embodiments of the splice enclosure, the splice enclosure further includes a cover portion configured to be pivotably attached to the body portion.

According to various aspects of the above embodiments of the splice enclosure, the adapter portion is configured to be pivotably attached to the lower portion.

According to various aspects of the above embodiments of the splice enclosure, the splice portion is configured to be pivotably attached to the lower portion.

According to various aspects of the above embodiments of the splice enclosure, the body portion includes an input aperture that is configured to receive an upstream cable.

According to various aspects of the above embodiments of the splice enclosure, the upstream cable includes a bypass fiber and a terminated fiber.

According to various aspects of the above embodiments of the splice enclosure, the body portion includes an output aperture that is configured to receive a downstream cable that includes the bypass fiber.

According to various aspects of the above embodiments of the splice enclosure, the splice portion comprises a slice tray and includes an upper spool hub, and wherein the upper spool hub is configured to store an excess length of the terminated fiber.

According to various aspects of the above embodiments of the splice enclosure, the lower portion comprises a lower main spool.

According to various aspects of the above embodiments of the splice enclosure, the adapter portion includes an adapter plate and an adapter.

According to various aspects of the above embodiments of the splice enclosure, the adapter is configured to optically couple the terminated fiber with a fiber of a drop cable.

BRIEF DESCRIPTION OF THE DRAWINGS

Further advantages and features of the present disclosure will become apparent from the following description and the accompanying drawings, to which reference is made. In which are shown.

DETAILED DESCRIPTION

Figure 1:
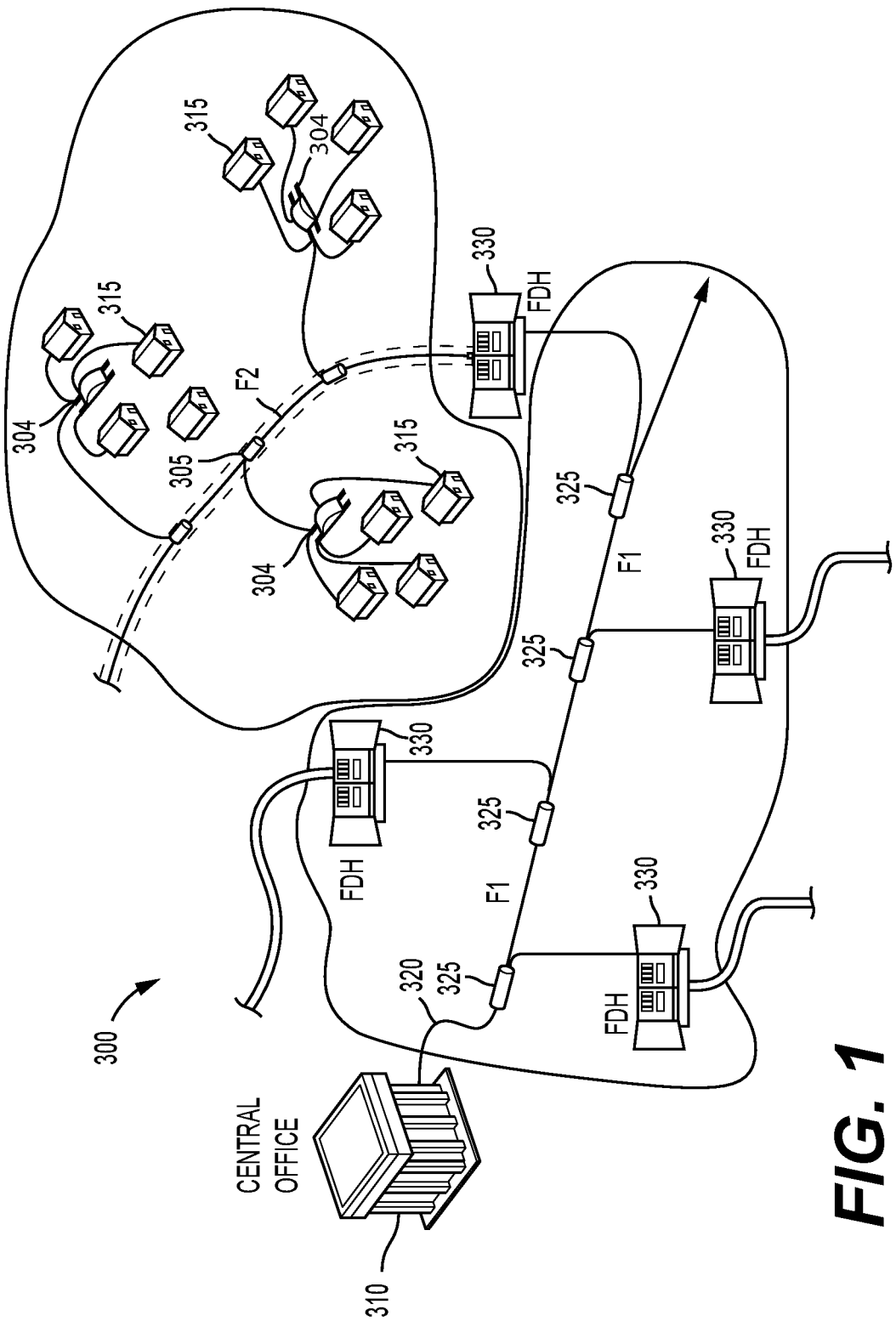
FIG. 1 shows a prior art passive fiber optic network.
Figure 2:
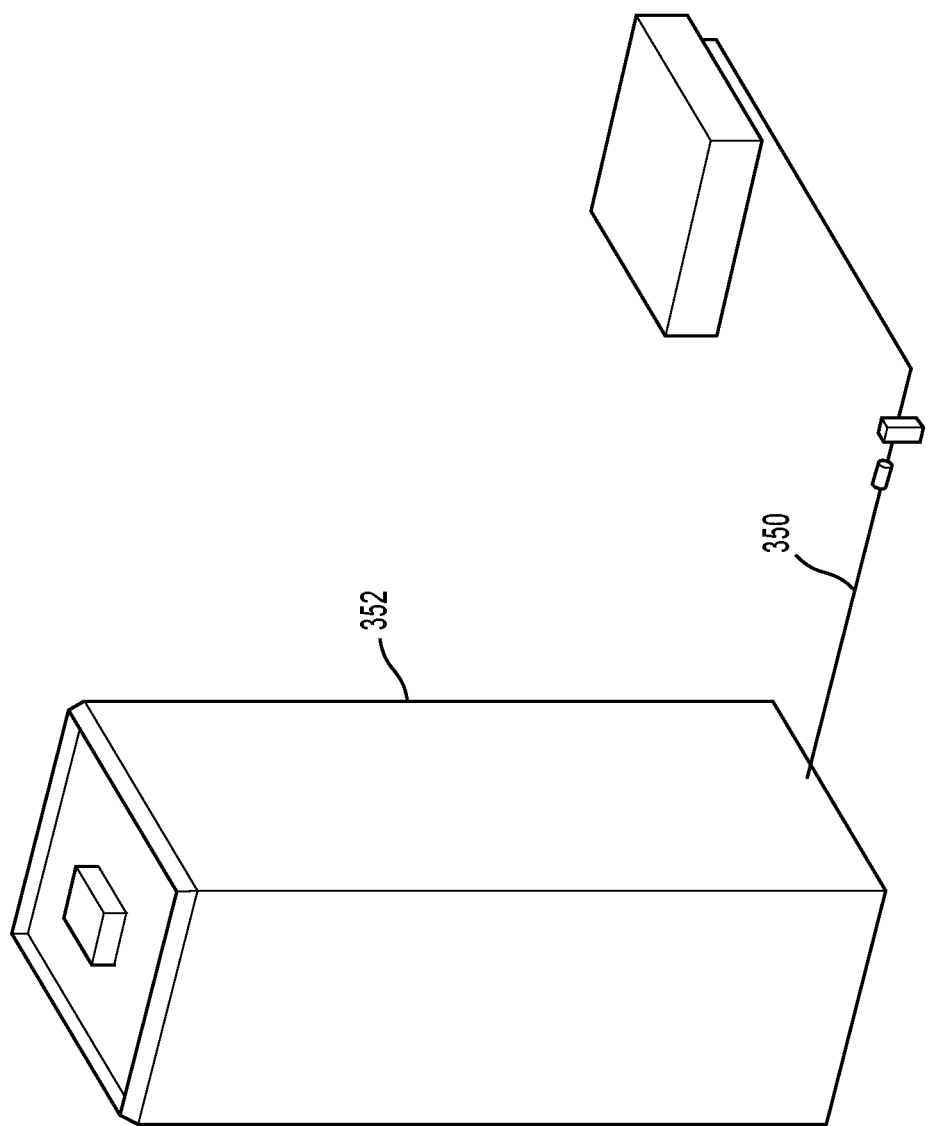
FIG. 2 shows an exemplary passive fiber optic network.

Reference will now be made in detail to presently preferred compositions, embodiments and methods of the present disclosure, which constitute the best modes of practicing the present disclosure presently known to the inventors. The figures are not necessarily to scale. It is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The present disclosure relates generally to enclosures or terminals configured to be easily mounted at mid-span locations along the length of a fiber optic telecommunications cable. It is preferred for wall boxes in accordance with the principles of the present disclosure to be used for indoor applications such as multi-dwelling units, or commercial buildings where a plurality of subscribers is located. However, it will be appreciated that wall boxes in accordance with the principles of the present disclosure can be used for either indoor or outdoor applications wherever it is desired to easily mount an enclosure at a mid-span location of a telecommunications cable. Certain embodiments can be sealed for use in below grade applications (e.g., for use in hand holes).

Embodiments provide a splice enclosure where a splice tray is configured to permit access to an adapter holder when the splice tray is pivoted to a second position such that the adapter holder can be pivoted to a second position so as to provide improved access to an adapter that is configured to be coupled with the adapter holder and to optically couple a terminated fiber with a fiber of a drop cable.

FIGS. 3-15 show an enclosure 10 having features in accordance with the principles of the present disclosure. In embodiments, the enclosure 10 includes a cover 14, a back side 16 (see FIG. 14), a top side 18, a bottom side 20, a right side 22 and a left side 24. The enclosure 10 includes a main body 12 defined by the back side 16, the top side 18, a bottom side 20, the right side 22 and the left side 24 which are integral to each other. In embodiments, the cover 14 is pivotably mounted to the top side 18 of the main body 12. The cover 14 is movable between a first closed position (shown in FIG. 3), and a second open position (shown in FIG. 4) which allows access into the interior of the enclosure 10 from the cover 14 of the enclosure 10. The main body 12 also defines bottom open regions (or apertures) 26 located proximate to one of the corners of the enclosure 10 and are defined, in this example, on the bottom side 20. The enclosure 10 also includes a cable cover 28 that may be integral to the main body 12 to cover bottom open regions 26. The enclosure 10 further includes a splice tray 30 that mounts to a lower portion (such as a lower spool module) 32 (See FIGS. 11 and 12) which is disposed in an interior chamber of the enclosure 10. The splice tray 30 is accessible through the opening 36 (see FIG. 4) defined by the main body 12 when the cover 14 is open.

Figure 4:
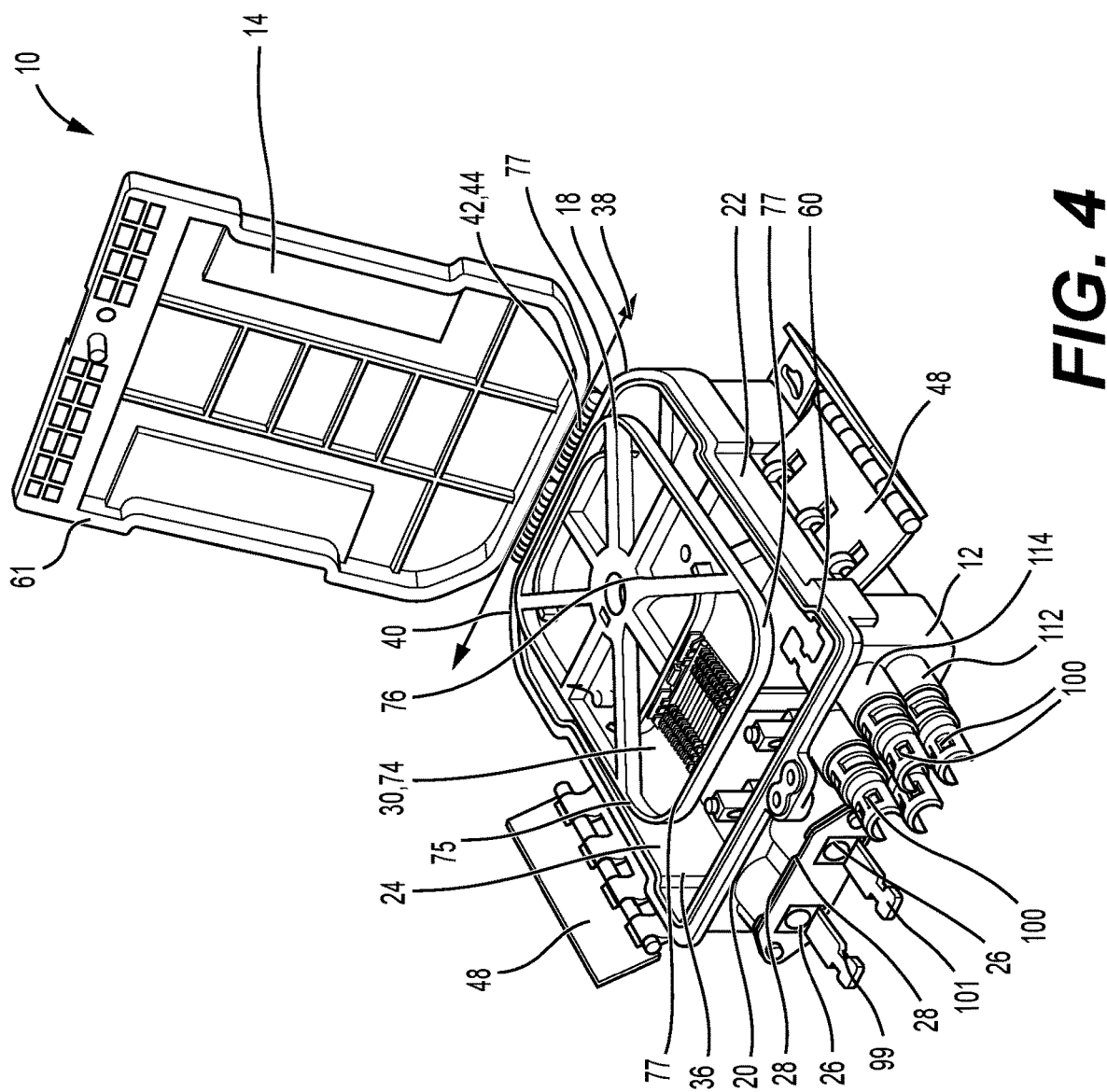
FIG. 4 shows the splice enclosure of FIG. 3 with the cover in an open position and side latches in an open position.

For ease of explanation, the various sides of the enclosure have been described as being "top", "bottom", "right" and "left" sides so as to correspond with the orientation of the enclosure shown at FIG. 4. However, it will be appreciated that when used in the field, the enclosure can be mounted at any orientation. For example, if the distribution cable 98 is routed horizontally, the sides 18, 20 would be oriented to define the left and right sides of the main body, and the sides 22, 24 would be oriented to define the top and bottom sides of the main body.

The cable cover 28 may be integral to the main body 12 of the enclosure 10 to facilitate positioning the enclosure 10 at a mid-span access location of a telecommunications cable 98. The cable openings 26 may be provided at the top and/or bottom sides 18, 20 of the enclosure 10 for allowing the portions of the telecommunications cable entering (98) and exiting (101) (see FIG. 9) of the mid-span access location to enter and exit the enclosure 10.

Figure 3:
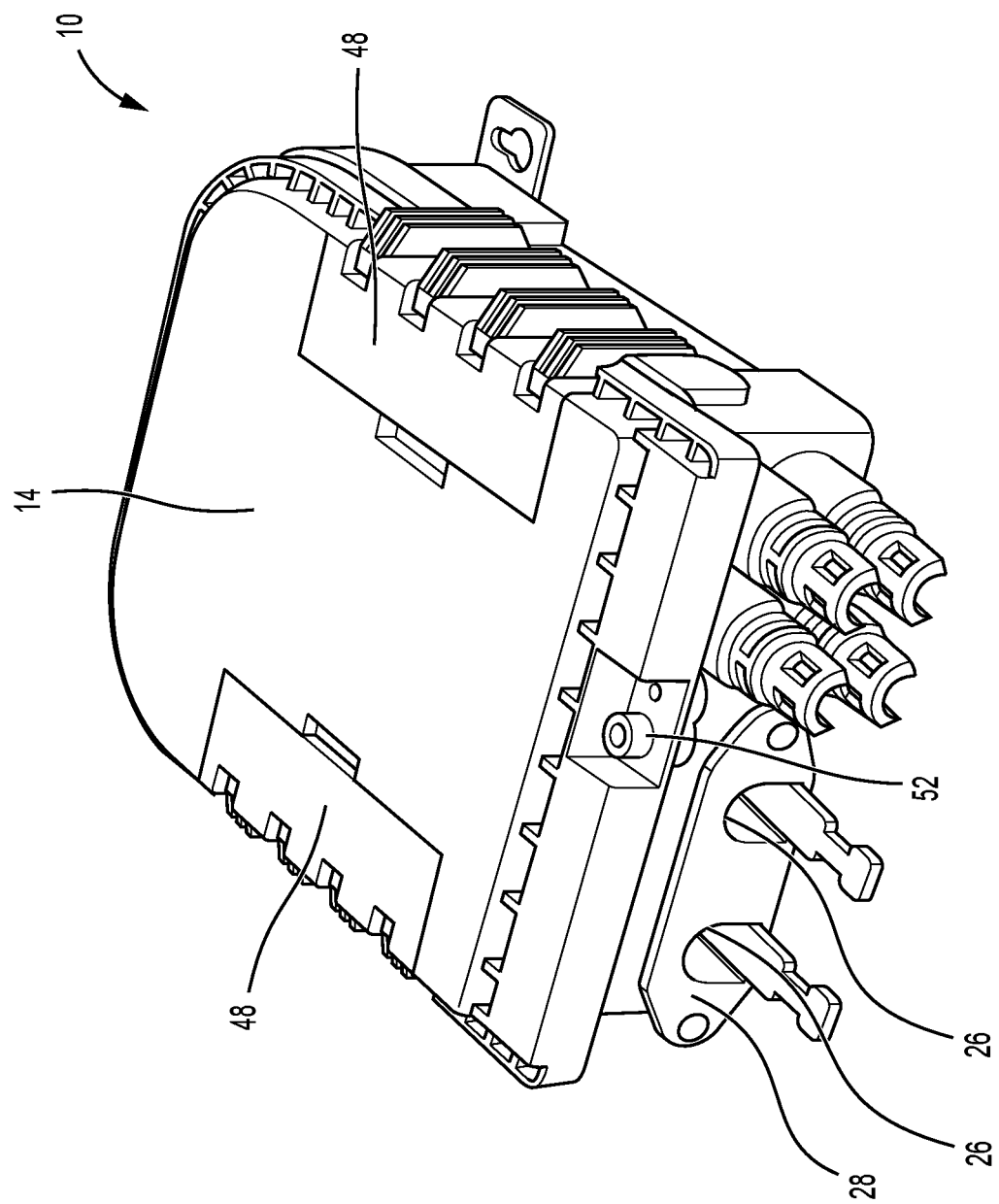
FIG. 3 shows an exemplary splice enclosure in accordance with various aspects of the disclosure with a cover in a closed position.

As shown in FIG. 4, the cover 14 is pivotably connected to the main body 12 at a vertical pivot axis 38 located generally adjacent a top side edge 40 of the main body 12. In embodiments, the pivotable connection between the cover 14 and the main body 12 is provided by a hinge arrangement that includes a pair of hinge pins 42 integrally formed with either the main body 12 or cover 14. A pair of hinge pin receivers 44 integrally formed with the other of the main body 12 or cover 14 receive hinge pins 42 to form the hinge arrangement. In embodiments, the hinge pin receivers 44 each include a pair of opposing, flexible arms that defines a pocket into which the hinge pins 42 can be snapped to provide the pivotable connection between the cover 14 and the main body 12. The enclosure 10 also includes a fastening arrangement 52 (see FIG. 3) for securing the cover 14 in the closed position. The fastening arrangement 52 includes a fastener which secures the cover 14 to the main body 12. As shown in FIGS. 3-4, latching members 48 may be pivotably attached to the left side 24 and right side 22 of the main body 12. When the cover 14 is in the closed position (see FIG. 3), each latching member 48 may also be pivoted to the closed position as shown in FIG. 3 wherein each latching member 48 exerts a force 51 (FIG. 7) on the cover 14 thereby compressing a seal (or gasket) 61 between the cover 14 and the main body 12.

The structure described above provides a sealed relationship between the cover 14 and the main body 12 when the cover 14 is in the closed position. For example, in the embodiment shown in FIGS. 4, 7, and 8, the main body 12 can define a front edge 60 that extends generally around the perimeter of the opening 36 of the main body 12. In embodiments, the front edge 60 of the main body 12 fits within a corresponding channel (or receptacle 62) defined on the back side of the cover 14. In embodiments, the gasket 61 can be provided within the channel 62 of the cover 14 so as to provide a seal between the cover 14 and the main body 12 when the cover 14 is closed-particularly when the latching members 48 are in their closed position as shown in FIG. 3.

Figure 6:
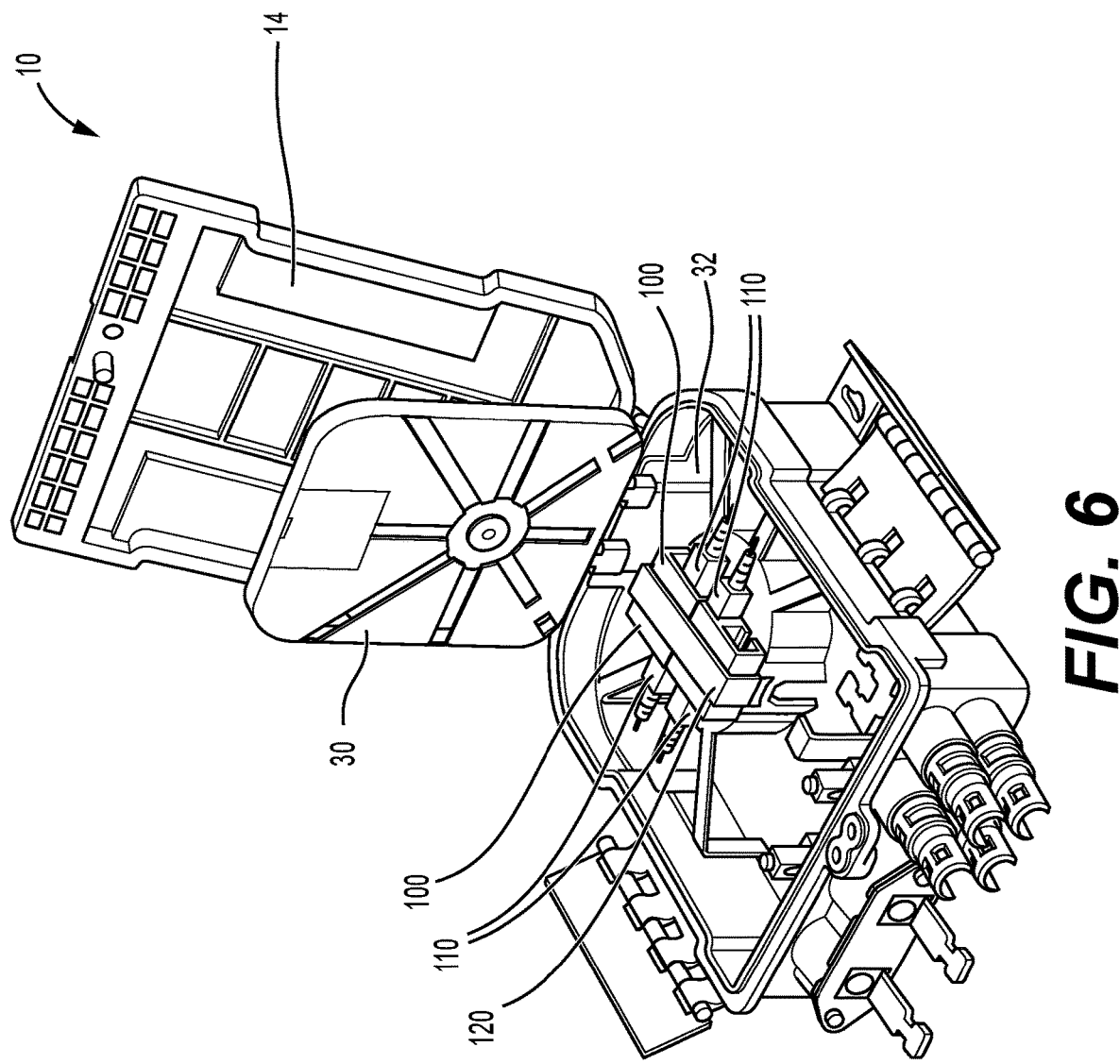
FIG. 6 shows the splice enclosure of FIG. 3 with the cover and splice tray pivoted in the upper position, and the adapter plate pivoted in a stowed position.
Figure 7:
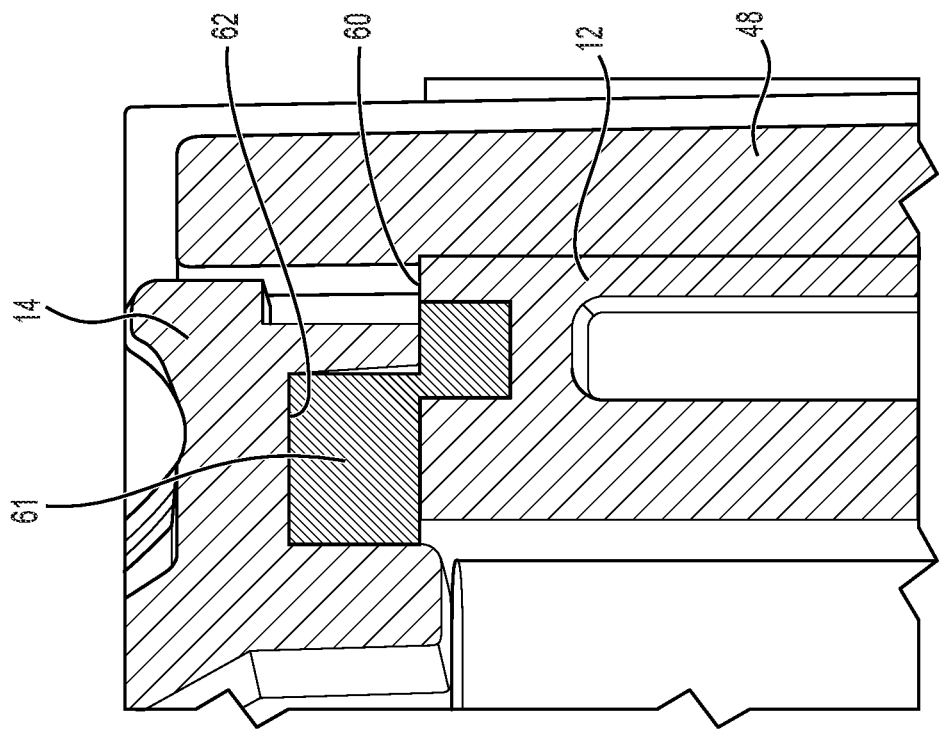
FIG. 7 is a cross-sectional view along line 7A-7A in FIG. 3 when the enclosure is fully closed.
Figure 8:
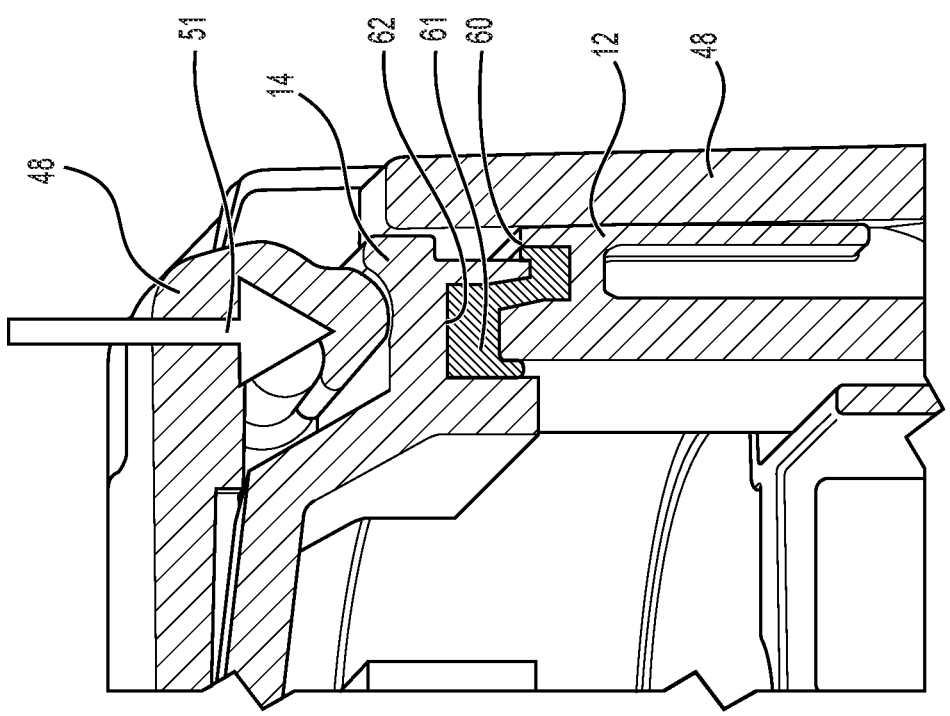
FIG. 8 is a cross-sectional view along line 7A-7A in FIG. 3 when the enclosure is partially closed.
Figure 11:
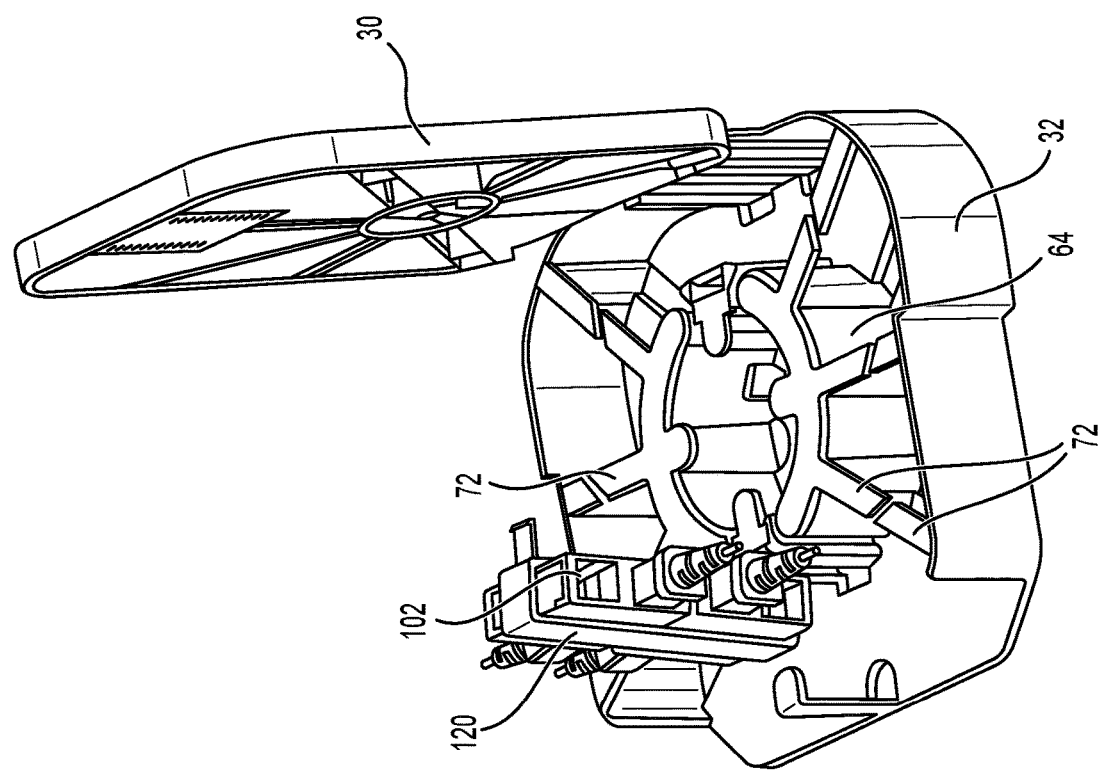
FIG. 11 is an upper side perspective view of the splice enclosure of FIG. 3 showing a spool module.

Referring to FIGS. 6 and 11, an example cable/fiber management structure is shown within the interior of the enclosure 10. For example, as shown in FIG. 11, a lower spool hub 64 is shown integrally formed as part of the spool module 32. The outer surface of the lower spool hub 64 acts as a bend radius limiter that is at least as large as a minimum bend radius requirement of the optical fiber desired to be stored around the lower spool hub 64 within the enclosure 10. The spool module 32 also includes cable retention members 72 that project outwardly from an upper area of the lower spool hub 64. The cable retention members 72 (see FIGS. 11 and 12) function to prevent cables looped around the lower spool hub 64 from migrating off of the lower spool hub 64.

Figure 10:
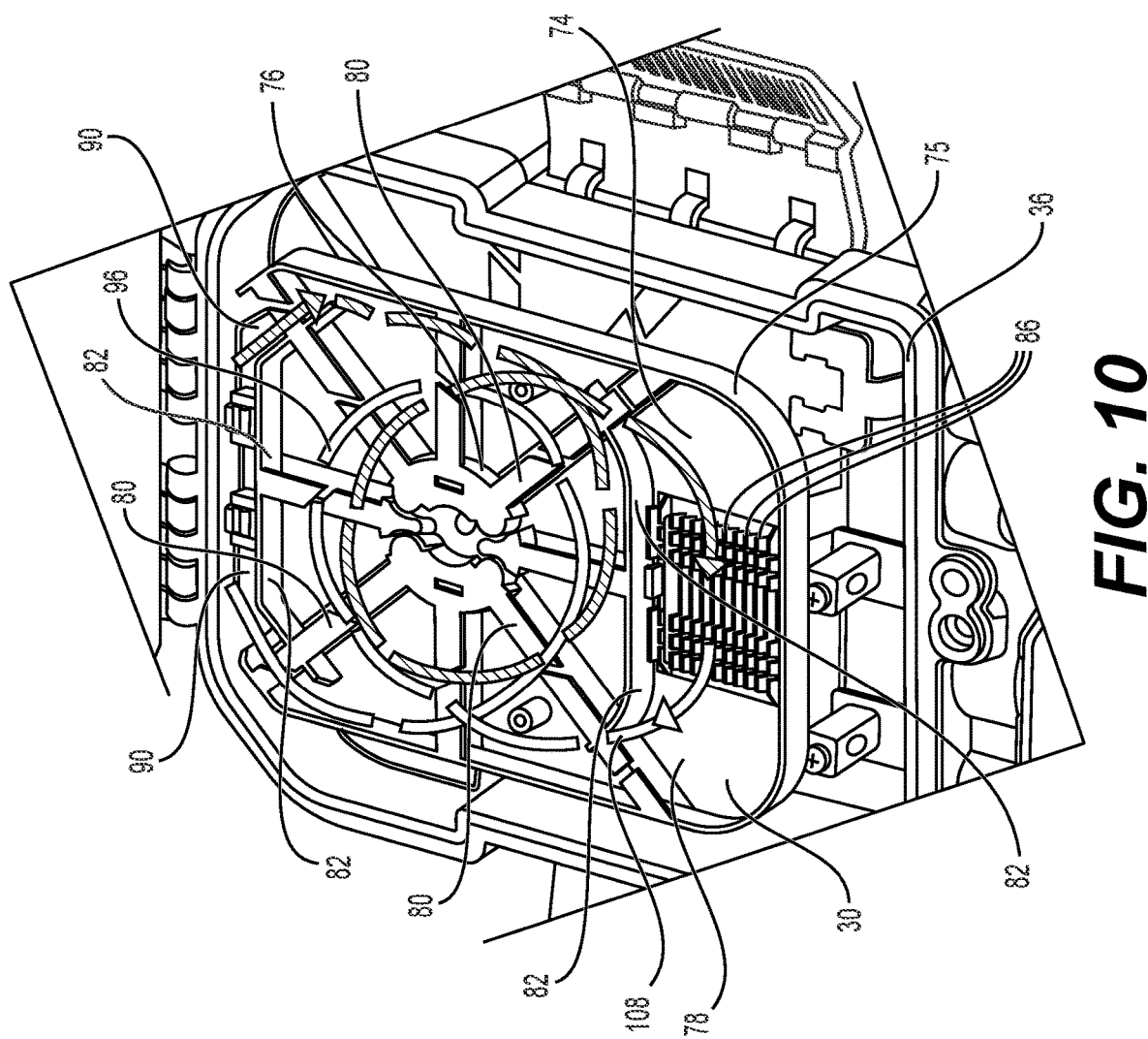
FIG. 10 is an upper perspective view of the splice enclosure of FIG. 3 with the cover in an open position and showing the splice tray.

The splice tray 30 also provides cable/fiber management within the interior of the enclosure 10. Referring to FIGS. 4 and 10, the splice tray 30 includes a generally rectangular main panel 74 having optional rounded corners. A perimeter wall 78 projects forwardly from the main panel 74 and extends around the perimeter 75 of the main panel 74. The optional rounded corners 77 of the main panel 74 may assist in fiber bend radius protection. An upper spool hub 76 also projects forwardly from the main panel 74. The upper spool hub 76 has an outer curvature selected to provide bend radius protection to fibers 96 routed about the exterior of the upper spool hub 76. In use, excess fiber can be looped around the upper spool hub 76 so as to form an elongated fiber storage loop at the front side of the main panel 74. Fiber retention fingers 80 project outwardly from the upper spool hub 76 and inwardly from side retention members 82 which are integrally formed in main panel 74. The fiber retention fingers 80 function to assist in retaining slack fibers within the area defined between upper spool hub 76 and the side retention members 82.

As shown in FIG. 10, a splice sleeve holder 86 can be mounted to (or integral to) the main panel 74 in a region adjacent to the upper spool hub 76 (i.e., in a region bound by the side retention members 82 and the perimeter wall 78. The splice sleeve holder 86 is configured to hold splice sleeves used to provide mechanical support to a fusion splice formed between two optical fibers. One or more passages 90 can be defined through the main panel 74 for allowing optical fibers to be routed from the lower spool hub 64 disposed proximate to a back side of the splice tray 30 to the front side of the splice tray 30.

Figure 9:
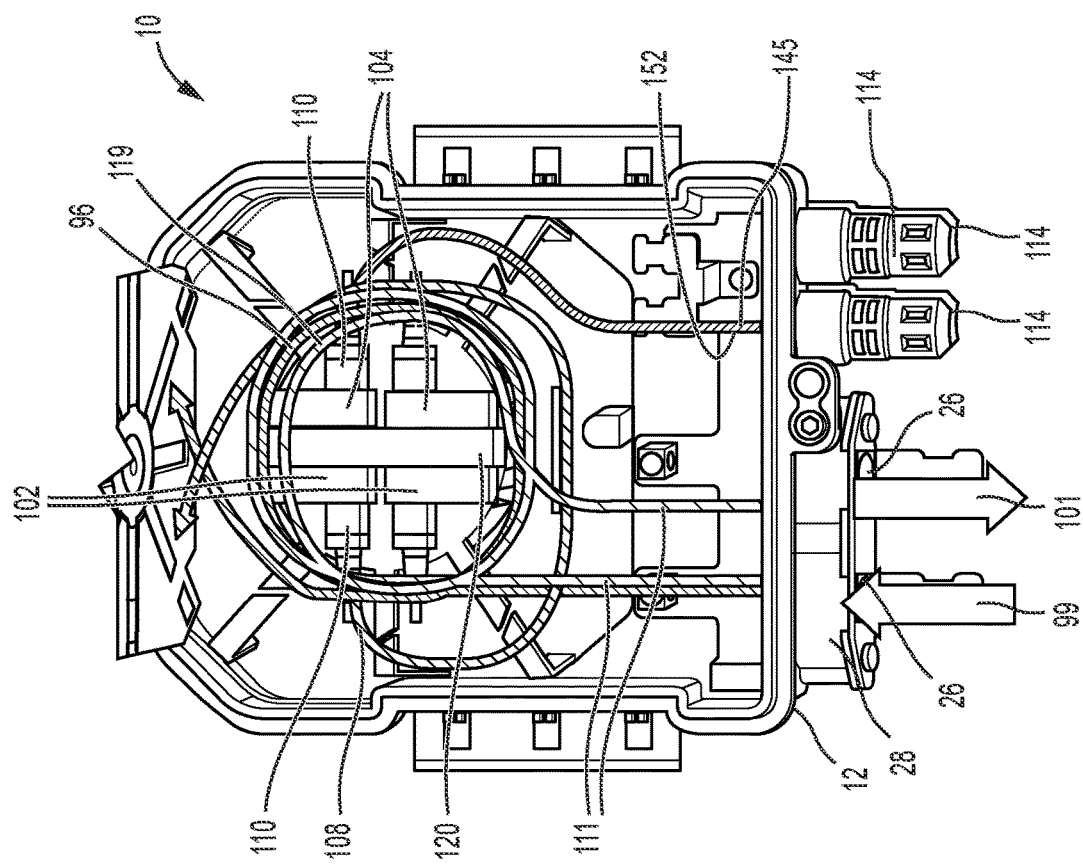
FIG. 9 is a plan view of the splice enclosure of FIG. 3 with the cover in the open position.

Referring to FIGS. 3 and 9, each of the bottom open regions 26 defined by the main body 12 is configured to allow a fiber optic cable to be mounted in a pass-through configuration within the enclosure 10. In this pass-through configuration, a mid-span access location of the cable is located within the enclosure 10, and upstream 99 and downstream 101 portions of the cable are routed in and out of the enclosure 10 through two of the bottom open regions 26. As shown, the cable cover 28 may be integral to the main body 12 and may be half cylinders integral to the main body 12.

The enclosure 10 may be configured to be easily mounted to a vertical surface such as a pole or wall. In certain embodiments, one or more mounting flanges can be integrally formed with the main body 12 for allowing the enclosure 10 to be readily fastened to a wall, pole or other structure. In still other embodiments, the enclosure 10 can be used in combination with a separate bracket arrangement that is pre-mounted to a structure, such as a wall or pole, and that receives or otherwise attaches to the enclosure 10 to allow the enclosure 10 to be readily mounted to the wall, pole or other structure.

To mount the enclosure 10 at a corresponding mid-span location of a cable, the cable is initially prepared by stripping away the outer jacket of the cable for a desired length at the mid-span location. In one embodiment, about 4 feet of the outer jacket can be stripped away. The stripped portion 111 (FIG. 9) of the cable can then be spooled around the lower spool hub 64.

To access fibers within the enclosure 10, selected fibers from the multi fiber cable can be terminated proximate to the bottom open regions 26 so as to provide a length of terminated fiber within the enclosure 10. The length of terminated fiber can be spooled around the lower spool hub 64 and then routed up above the splice tray 30 (via openings 90 defined in the splice tray 30) around the upper spool hub 76 for storage purposes. When it is desired to splice one of the terminated fibers to a fiber of a distribution cable, the terminated fiber can be accessed from the upper spool hub 76 (which was routed through one of the openings 90 in the splice tray 30). At the front side of the splice tray 30, the terminated optical fiber can be spliced to a corresponding fiber of another cable (e.g., a distribution cable) with the splice being mounted at the splice sleeve holder 86 as shown at FIG. 10. As indicated, excess fiber from the distribution cable can also be stored by wrapping the excess fiber around the upper spool hub 76 at the front side of the splice tray 30.

Figure 12:
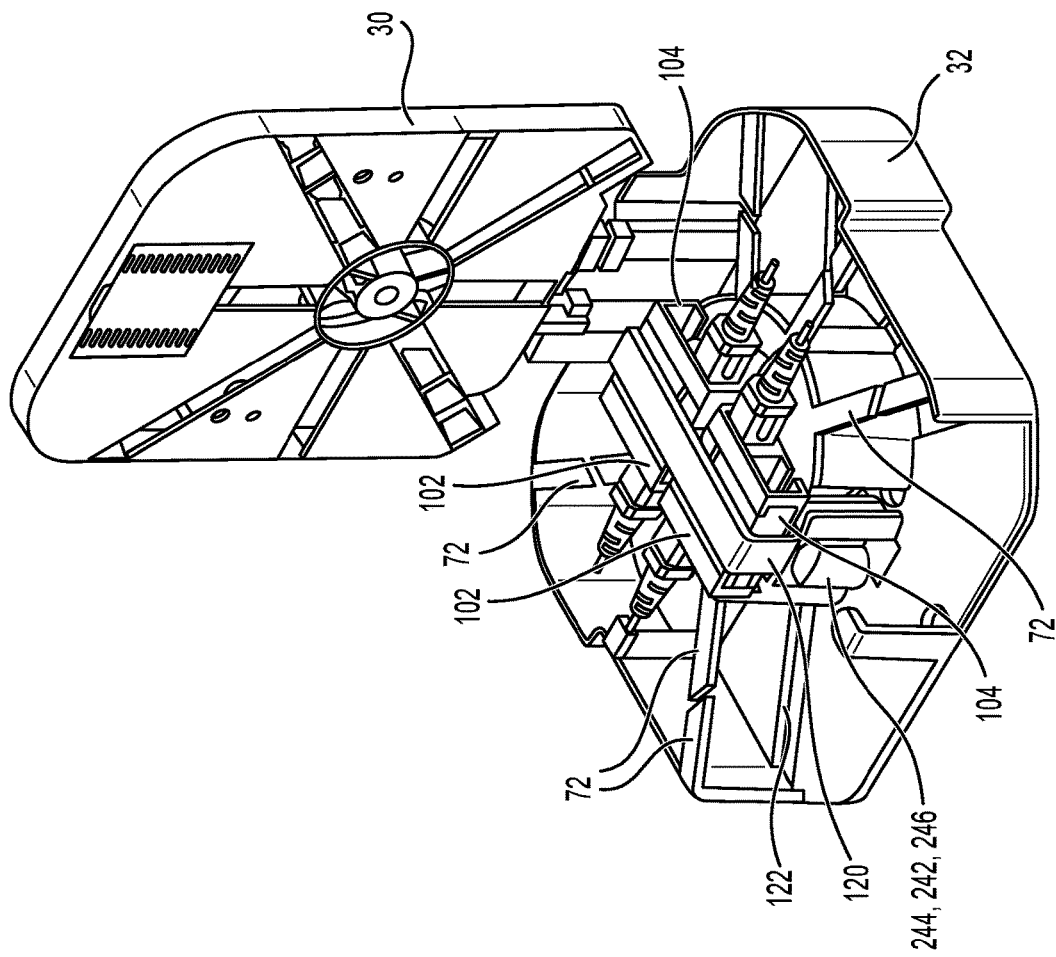
FIG. 12 is an upper side perspective view of the splice enclosure of FIG. 3 showing the spool module wherein the splice tray is pivoted up and adapter plate is pivoted down to the stowed position.
Figure 15:
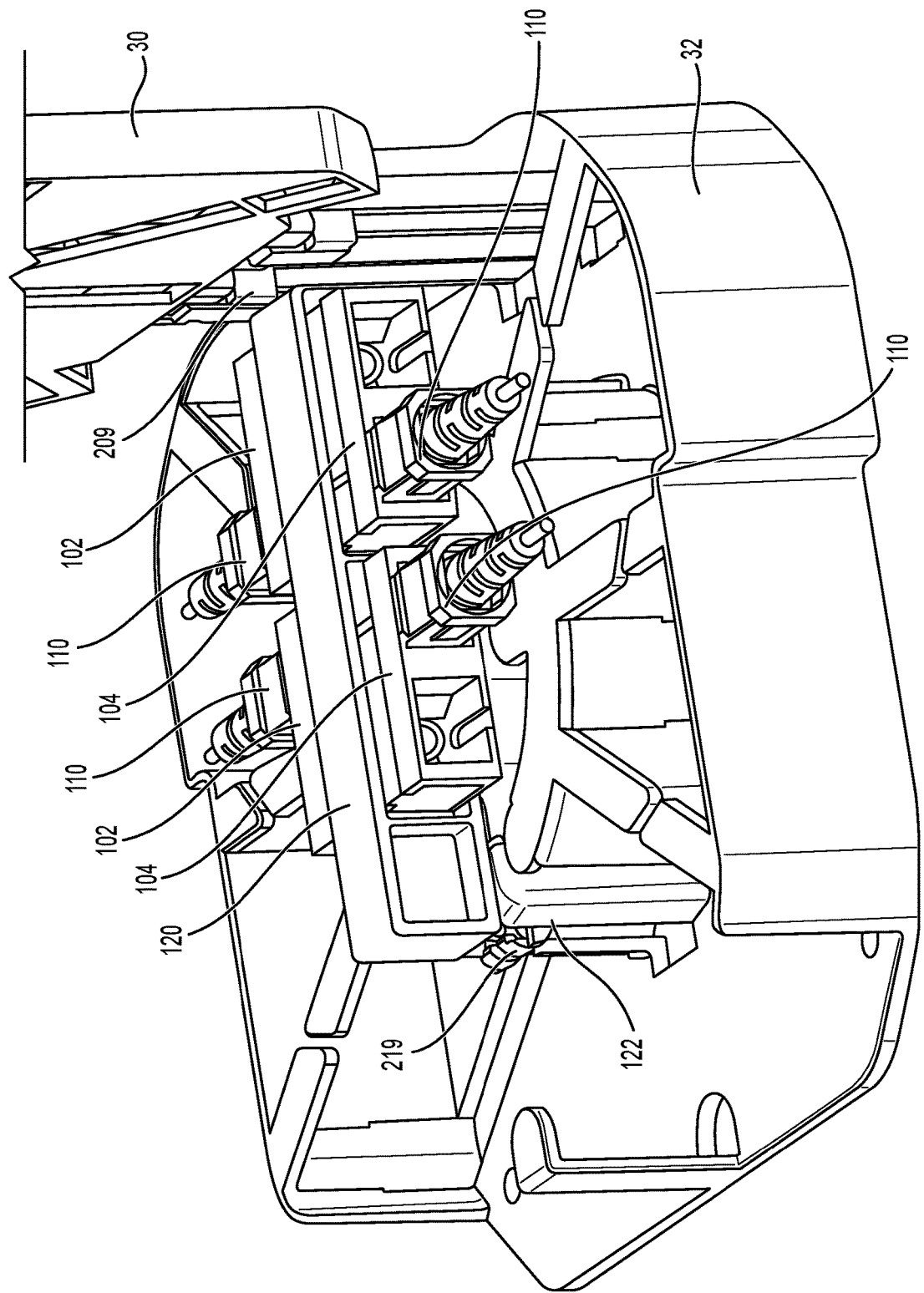
FIG. 15 is an upper side perspective view of the splice enclosure of FIG. 3.

The fiber to which the terminated fiber is spliced is then routed into the enclosure 10 through one of the openings 90 of the splice tray 30 and the fiber is routed to an adapter portion (such as, for example, a pivotable adapter plate) 120 wherein a connector 110 is attached to the end of the fiber wherein the connector 110 is connected to one of one or more adapters (such as, for example, input ports) 102 connected to the adapter plate 120 (FIGS. 11, 12, and 15).

The adapter plate 120 has, in this example, adapters (such as, for example, output ports) 104 connected to adapter plate 120 to which connectors 110 can be connected. For example, pigtails 145 can be routed to the input port 152 at bottom wall 20 and then a cable exits from the output port 114 at bottom wall 20 to a residence. For certain applications, all of the input ports 112 and output ports 114 at the bottom wall 20 may be used as well as the bottom open regions 26. For example, for some applications, it may be desirable to pass two separate telecommunications cables (such as an input cable via one bottom open region 26 and an output cable via another bottom open region 26) through the enclosure 10. For other applications or to facilitate cable routing, the same telecommunications cable may be passed through one of the bottom open regions 26, looped around the lower spool hub 64, and then passed back though the other bottom open region 26 as an output cable, as shown in FIG. 9.

FIGS. 5, 6, 9, 12, and 15 illustrate the spool module 32 having the adapter plate 120 which is pivotably mounted to the spool module 32. A plurality of input ports 102 and output ports 104 are mounted to the adapter plate 120. The pivotable connection between the adapter plate 120 and the spool module 32 is provided by a hinge arrangement that may optionally include a pair of hinge pins 242 integrally formed with either the adapter plate 120 or a post 122 of the spool module 32. In embodiments, a pair of hinge pin receivers 244 are integrally formed with the other of the adapter plate 120 and the post 122. The hinge pin receivers 244 each include a pair of opposing, flexible arms 246 that defines a pocket into which the hinge pins 242 can be snapped to provide the pivotable connection between the adapter plate 120 and the post 122 of the spool module 32. The connectorized ends 110 of the pigtails 108 (see FIG. 9) are preferably inserted within the input ports 102 of the adapter plate 120. By plugging a connectorized end 110 of a drop cable into an output port 104 of adapter plate 120, the drop cable can be optically connected to one of the fibers of the cable passed through the enclosure 10.

Figure 5:
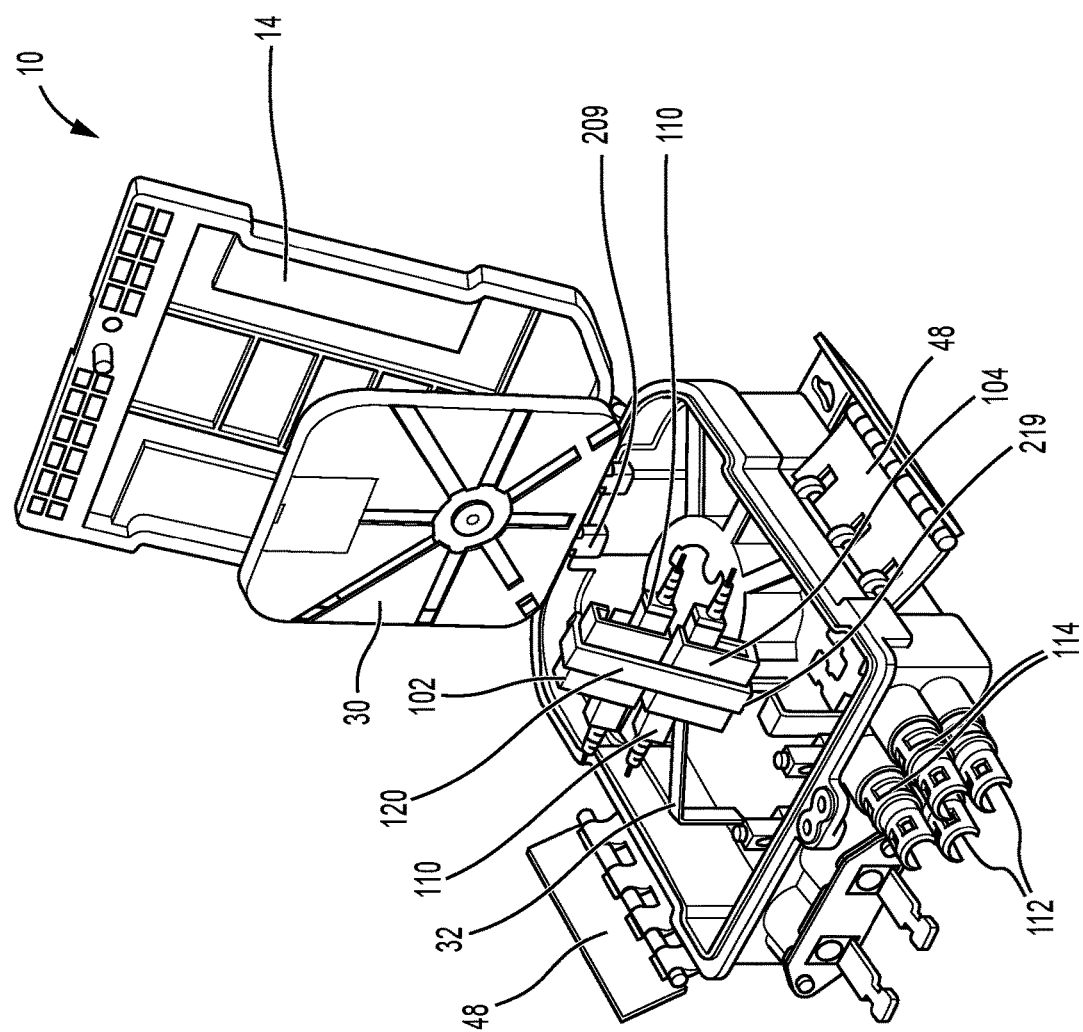
FIG. 5 shows the splice enclosure of FIG. 3 with the cover, a splice tray, and an adapter plate pivoted in an upper position.

Referring to FIG. 15, embodiments of the enclosure 10 of the present disclosure include a three-level design wherein the lower spool hub 64 is the first level. As shown in FIG. 15, when the adapter plate 120 is pivoted down into its stowed position, the adapter plate 120 constitutes a second level of the design such that the adapter plate 120 is disposed above the lower spool hub 64 (and below the splice tray 30). The splice tray 30 is the third level of the design such that when the splice tray 30 is pivoted down to its closed position (shown in FIG. 4), then the adapter plate 120 is disposed between the splice tray 30 and the lower spool hub 64. Also, as shown in FIG. 5, the adapter plate 120 pivots away from the splice tray 30 at hinge 219 to allow a user to have better access and better clearance around the connectorized ends 110 when the user must connect and/or disconnect the connectorized ends 110 from the adapter plate 120. Without the pivoting feature of the adapter plate 120, a user would find it difficult or impossible to connect and disconnect connectorized ends 110 to/from the adapter plate 120 in the lower or closed position of the adapter plate 120. With reference to FIG. 15, the hinge 209 for the splice tray 30 is disposed proximate to the edge of the main body 12 and the hinge 219 for the adapter plate 120 is disposed proximate to the top end of the post 122 such that splice tray 30 stays above the adapter plate 120 when both the splice tray 30 and adapter plate 120 are pivoted down in the stowed position. As a result of arranging the adapter plate 120 between the lower spool hub 64 and the splice tray 30, the splice tray 30 maximizes its surface area (within the opening 36 of the main body 12) with the upper spool hub 76 and the splice holder 86. See FIG. 10.

It is also understood that there is also a plurality of input ports 112 and output ports 114 which are mounted to the main body 12. See FIG. 9. As previously noted, through the use of the enclosure 10, certain fibers from a mid-span access location of a cable passed through the enclosure 10 are spliced to a plurality of fiber optic pigtails 108 having connectorized ends 110. See FIGS. 9 and 10. As previously noted with respect to the adapter plate 120, the connectorized ends 110 of the pigtails 108 are inserted into the input ports 102 of the adapter plate 120. See FIG. 9. By plugging a connectorized end 110 of a drop cable into an output port 104 of the adapter plate 120, the drop cable can be optically connected to one of the fibers of the cable which passes through an input port 112 and an output port 114 which are mounted onto the main body 12 in order to exit the enclosure 10.

Referring back to FIG. 8, the bottom side 20 of the main body 12 is used to support the input ports 112 and the output ports 114 of the enclosure 10. The adapter plate 120 may define an adapter axis that is generally parallel or aligned to the through-cable routing axes. In this way, drop cables optically connected to the adapter plate 120 can be routed away from the enclosure 10 in directions generally parallel to a through-cable that passes through the enclosure 10 via the input ports 112 and the output ports 114.

Figure 13:
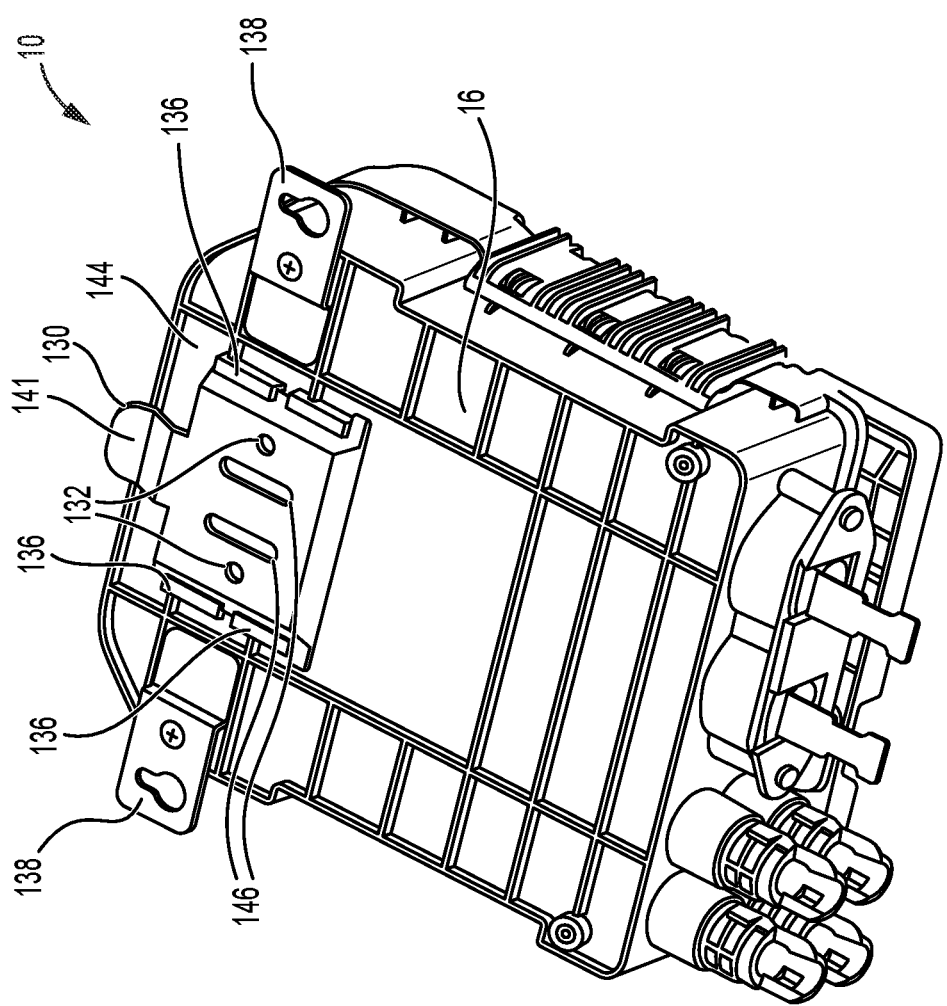
FIG. 13 is a rear perspective view of the splice enclosure of FIG. 3.
Figure 14:
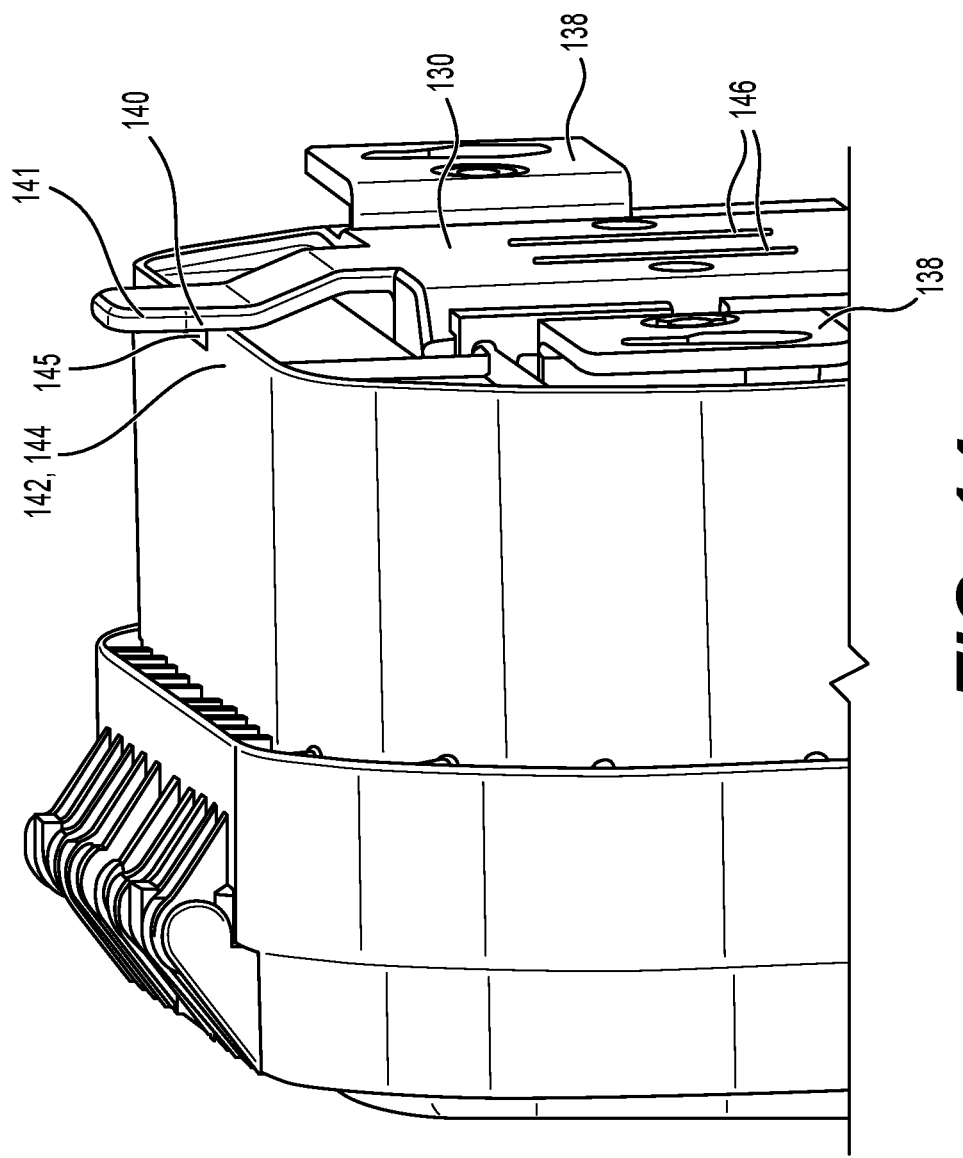
FIG. 14 is a side upper perspective view of the splice enclosure of FIG. 3.

FIG. 13 shows the back side of the enclosure 10 and, in this example, shows the back side of the enclosure 10 having at least one pair of channels 136. A bracket 130 may be affixed to a pole or other mounting surface via screws (not shown) which are received in apertures 132 in the bracket 130. Once the bracket 130 is mounted to a pole or other mounting surface, then the enclosure 10 can be mounted to the bracket 130 by sliding the enclosure 10 onto the bracket 130. Referring to FIG. 14, an upper tab 141 on the bracket 130 defines a protrusion 140 which abuts the outside edge 142 of a flange 144 of the main body 12 in order to prevent the enclosure 10 from inadvertently slipping off of the bracket 130. However, it is understood that the protrusion 140 may be implemented in a different position on the tab 141 so that the protrusion 140 abuts an inside edge 145 of the flange 144.

As an alternative to using screws in the bracket 130, elongated apertures 146 on the bracket 130 can be used to thread a loop or metal or other material (not shown) through the bracket 130 (which is affixed to the enclosure as previously described) so that the loop can be attached to a pole.

Wing brackets 138 are attached to the back side of the main body 12 as shown in FIG. 13. Wing brackets 138 have, in this example, key holes that can be used to hang the enclosure 10 by screw, nails, or other headed fasteners.

According to the above, an exemplary splice enclosure of the present disclosure includes a main body 12, a cover 14, a spool module 32, an adapter plate 120, and a splice tray 30. The main body 12 defines a chamber having an opening 36. The cover 14 may be pivotably attached to a top side of the main body 12. The adapter plate 120 may be configured to be pivotably attached to a post of the spool module 32. The cover 14 may be configured to selectively open and close access to the chamber of the main body 12 wherein the cover 14 is configured to pivot open in a first direction. See FIG. 5. The adapter plate 120 is configured to pivot open in a second direction (see FIG. 5) to provide improved access to ports 102, 104 of the adapter plate 120. The adapter plate 120 is disposed between the splice tray 30 and the lower spool hub 64 when the splice tray 30 and the adapter plate 120 are pivoted down to a closed position. See FIG. 4. The splice tray 30 defines a perimeter 75 which is substantially commensurate with the opening 36 of the main body 12. See FIG. 4.

Therefore, it is understood that an aperture (bottom open region) 26 in a plurality of apertures (bottom open region) 26 is configured to receive an upstream cable portion. The upstream cable portion includes a plurality of bypass fibers and a plurality of terminated fibers. The lower spool hub 64 and the upper spool hub 76 are configured to store an excess length of the plurality of terminated fibers which are would around the upper spool hub 76 and the lower spool hub 64. See FIGS. 9 and 10. The plurality of bypass fibers are routed out of the main body 12 via a second aperture (bottom open region) 26. Referring to FIGS. 9 and 10, the plurality of terminated fibers are routed from the lower spool hub 64 to the upper spool hub 76 and then the terminated fibers are spliced to another set of corresponding terminated fibers at the splice holder 86 (see FIG. 10) defined on the splice tray 30.

Also, as described with reference to FIG. 10, the plurality of terminated fibers are configured to be spliced to a first set of pig tails 108 such that each terminated fiber is configured to be spliced to a corresponding pigtail in the first set of pigtails. As shown in FIG. 9, the first set of pigtails 108 is configured to be connected to a second set of pigtails at the adapter plate 120. The second set of pigtails are configured to be downstream cables which are configured to be routed from the adapter plate 120 to the ports 112, 114. (See FIG. 8).

While at least one example, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A splice enclosure structurally configured to provide improved access to an adapter comprising:
    a body configured to define a chamber having an opening;
    a cover configured to be pivotally coupled with the body so as to selectively close the opening;
    a spool module that includes a spool hub and a post;
    an adapter holder configured to be pivotally coupled with the post of the spool module;
    a splice tray configured to be pivotally coupled with the spool module;
    wherein the cover is configured to pivot relative to the body from a closed position that prevents access to the chamber to an open position that permits access to the chamber;

wherein the adapter holder is configured to pivot relative to the body between a first adapter holder position and a second adapter holder position;
wherein the splice tray is configured to pivot relative to the body between a first splice tray position and a second splice tray position;
wherein the adapter holder is configured to be disposed between the splice tray and the spool hub when the splice tray is in first splice tray position and the adapter holder is in the first adapter holder position such that the splice tray is configured to block access to the adapter holder;
wherein the main body includes an input aperture that is configured to receive an upstream cable;
wherein the upstream cable includes a bypass fiber and a terminated fiber;
wherein the main body includes an output aperture that is configured to receive a downstream cable that includes the bypass fiber; and
wherein the splice tray is configured to permit access to the adapter holder when the splice tray is pivoted to the second splice tray position such that the adapter holder is configured to be selectively pivoted to the second adapter holder position so as to provide improved access to an adapter that is configured to be coupled with the adapter holder and to optically couple the terminated fiber with a fiber of a drop cable.

2. The splice enclosure of claim 1, wherein the splice tray includes an upper spool hub, and wherein the upper spool hub is configured to store an excess length of the plurality of terminated fibers.

3. The splice enclosure of claim 1, wherein the splice tray comprises a splice holder.

4. The splice enclosure of claim 3, wherein the splice holder is configured to receive a splice of the terminated fiber to a first pigtail.

5. The splice enclosure of claim 4, wherein the first pigtail is configured to be connected to a second pigtail at the adapter holder.

6. The splice enclosure of claim 5, wherein the second pigtail is routed from the adapter holder to outside of the splice enclosure.

7. The splice enclosure of claim 1, wherein the splice tray is configured to define a perimeter which substantially covers the opening of the chamber.

8. The splice enclosure of claim 1, wherein the bypass fiber comprises a plurality of bypass fibers.

9. The splice enclosure of claim 1, wherein the terminated fiber comprises a plurality of terminated fibers.

10. A splice enclosure structurally configured to provide improved access to an adapter comprising:
a body portion configured to define a chamber having an opening;
a cover portion configured to be pivotally coupled with the body portion so as to selectively close the opening;
a spool portion configured to include a spool sub portion;
an adapter portion configured to be pivotably attached to the spool portion;
a splice tray portion configured to be pivotably attached to the spool portion;
wherein the adapter portion is configured to pivot relative to the body portion between a first adapter portion position and a second adapter portion position;
wherein the splice tray portion is configured to pivot relative to the body portion between a first splice tray position and a second splice tray position;
wherein the adapter portion is configured to be disposed between the splice tray portion and the spool sub portion when the splice tray portion and the adapter portion are in the first positions such that the splice tray portion is configured to block access to the adapter portion;
wherein the body portion is configured to receive a terminated fiber; and
wherein the splice tray portion is configured to permit access to the adapter portion when the splice tray portion is pivoted to the second splice tray position such that the adapter portion is configured to be selectively pivoted to the second adapter portion position so as to provide improved access to an adapter that is configured to be coupled with the adapter portion and to optically couple the terminated fiber with a fiber of a drop cable.

11. The splice enclosure of claim 10, wherein the splice tray portion includes an upper spool hub, and wherein the upper spool hub is configured to store an excess length of the terminated fiber.

12. The splice enclosure of claim 10, wherein the adapter portion comprises an adapter plate.

13. The splice enclosure of claim 10, wherein the body portion includes an input aperture that is configured to receive an upstream cable, and wherein the upstream cable includes a bypass fiber and the terminated fiber.

14. The splice enclosure of claim 13, wherein the bypass fiber comprises a plurality of bypass fibers.

15. The splice enclosure of claim 10, wherein the terminated fiber comprises a plurality of terminated fibers.

16. The splice enclosure of claim 10, wherein the splice tray portion comprises a splice holder.

17. The splice enclosure of claim 16, wherein the splice holder is configured to receive a splice of the terminated fiber to a first pigtail.

18. The splice enclosure of claim 17, wherein the first pigtail is configured to be connected to a second pigtail at the adapter portion.

19. The splice enclosure of claim 18, wherein the second pigtail is routed from the adapter portion to outside of the splice enclosure.

20. A splice enclosure structurally configured to provide improved access to an adapter comprising:
a body portion that includes an input aperture that is configured to receive an upstream cable;
a lower portion;
an adapter portion;
a splice portion;
wherein the adapter portion is configured to pivot relative to the body portion between a first adapter portion position and a second adapter portion position;
wherein the splice portion is configured to pivot relative to the body portion between a first splice portion position and a second splice portion position;
wherein the adapter portion is configured to be disposed between the splice portion and the lower portion when the splice portion is in the first splice portion position and the adapter portion is in the first adapter portion position such that the splice portion is configured to block access to the adapter portion; and
wherein the splice portion is configured to permit access to the adapter portion when the splice portion is pivoted to the second splice portion position such that the adapter portion is configured to selectively pivot to the second adapter portion position so as to provide improved access to an adapter that is configured to be coupled with the adapter portion.

21. The splice enclosure of claim 20, further comprising a cover portion configured to be pivotably attached to the body portion.

22. The splice enclosure of claim 20, wherein the adapter portion is configured to be pivotably attached to the lower portion.

23. The splice enclosure of claim 20, wherein the splice portion is configured to be pivotably attached to the lower portion.

24. The splice enclosure of claim 20, wherein the upstream cable includes a bypass fiber and a terminated fiber.

25. The splice enclosure of claim 24, wherein the body portion includes an output aperture that is configured to receive a downstream cable that includes the bypass fiber.

26. The splice enclosure of claim 24, wherein the splice portion comprises a slice tray and includes an upper spool hub, and wherein the upper spool hub is configured to store an excess length of the terminated fiber.

27. The splice enclosure of claim 20, wherein the lower portion comprises a lower main spool.

28. The splice enclosure of claim 20, wherein the adapter portion includes an adapter plate and an adapter.

29. The splice enclosure of claim 20, wherein the adapter is configured to optically couple the terminated fiber with a fiber of a drop cable.

* * * * *